June 7, 1949.　　　　T. W. F. BROWN　　　　2,472,279
PIPE EXPANSION JOINT
Filed Feb. 24, 1947　　　　　　　　　　　　　　3 Sheets-Sheet 1

INVENTOR
THOMAS WALTER
FALCONER BROWN
BY
Sawyer Thomas
ATTORNEYS

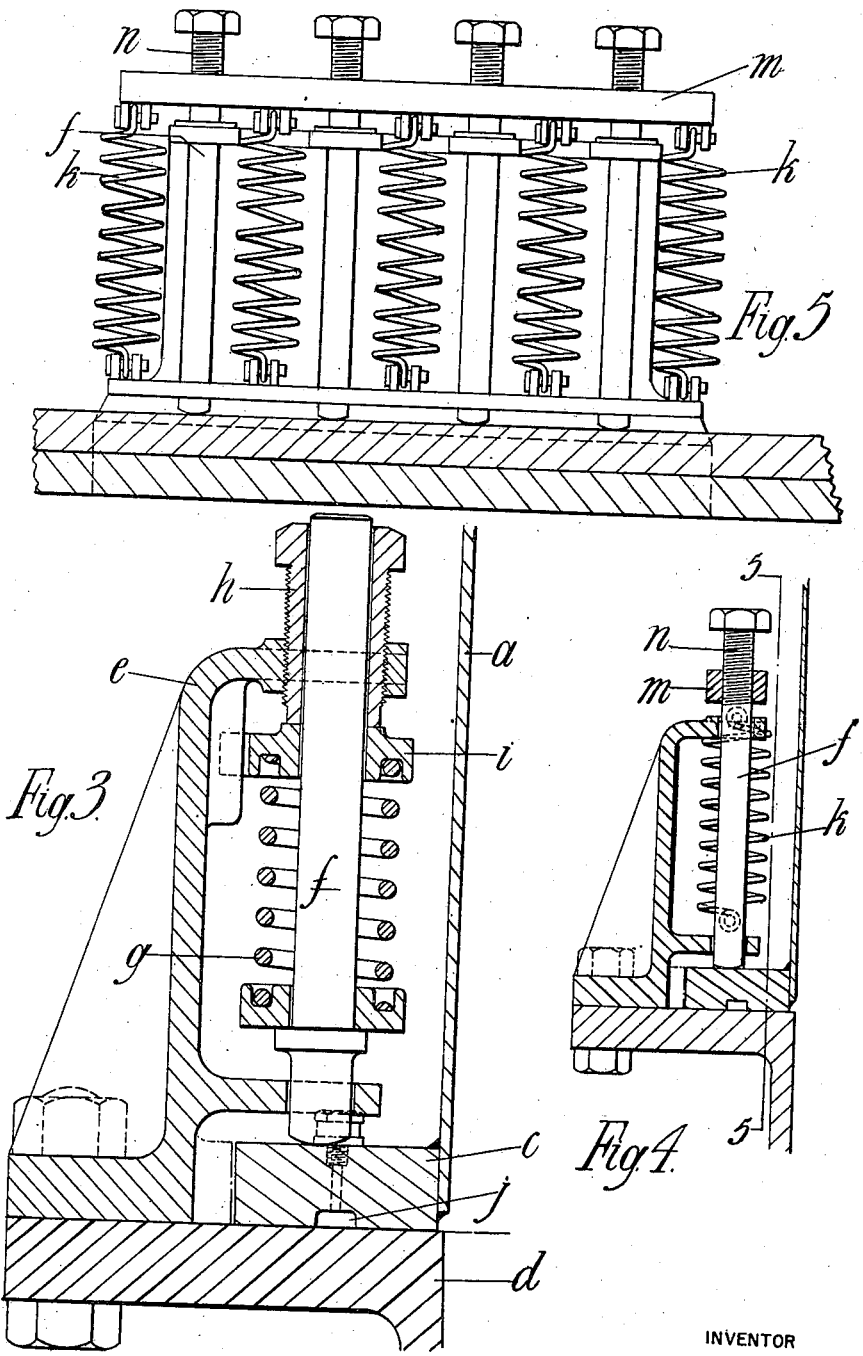

Patented June 7, 1949

2,472,279

UNITED STATES PATENT OFFICE 2,472,279

PIPE EXPANSION JOINT

Thomas Walter Falconer Brown, Newcastle on Tyne, England, assignor to The Parsons and Marine Engineering Turbine Research and Development Association, Wallsend, England Application February 24, 1947, Serial No. 730,510 In Great Britain June 19, 1946

5 Claims. (Cl. 285—130)

This invention relates to pipe expansion joints and has for its object to provide improved or simplified forms thereof enabling relative motion to take place between, say, a pipe conveying fluid at high temperature and a part to which the pipe is attached, without leakage of fluid.

The invention consists in an expanding pipe joint comprising features set forth in the claims appended hereto.

Figure 1:
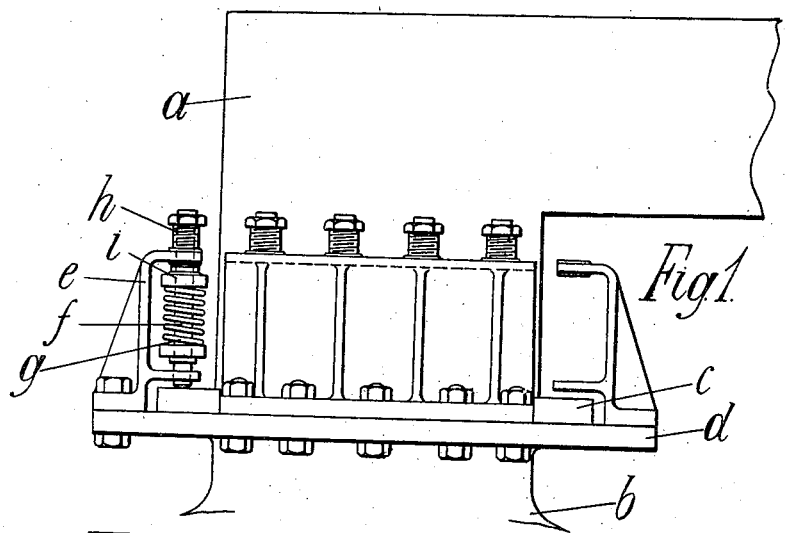
Figure 2:
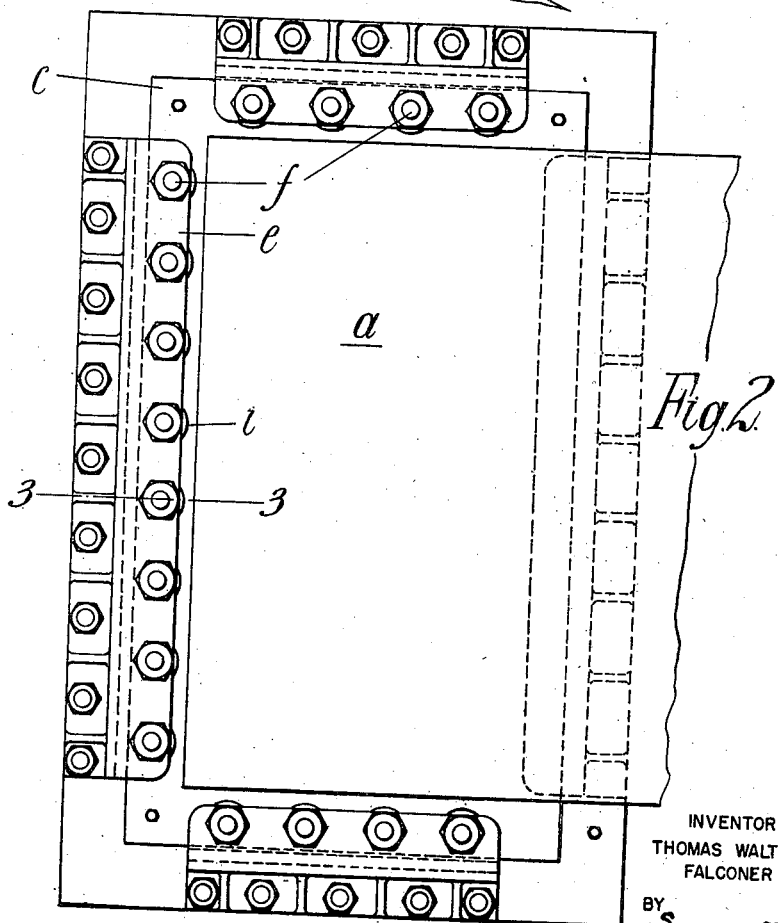
Figure 6:
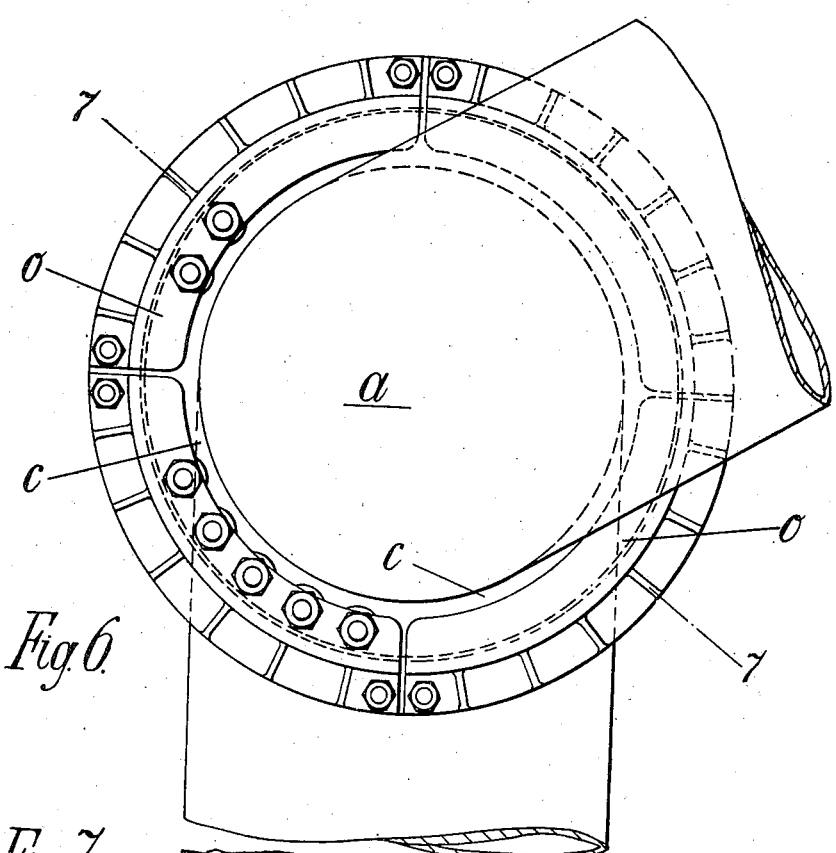
Figure 7:
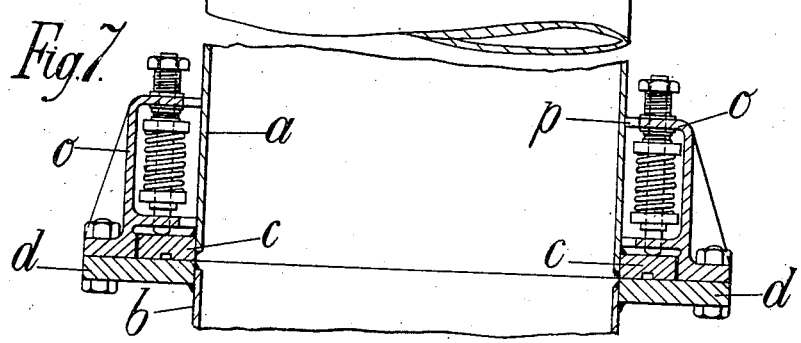
Figure 8:
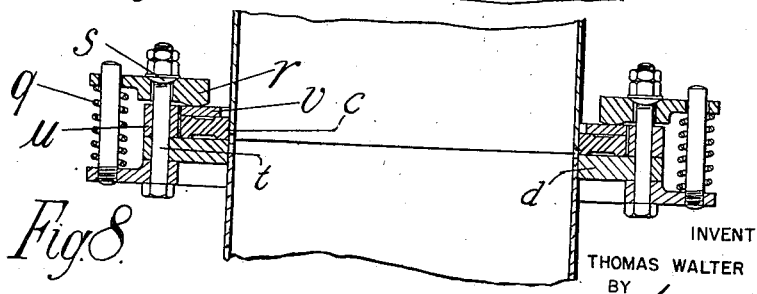

Referring to the accompanying diagrammatic drawings:

Figure 1 is a reduced elevational view of one convenient arrangement in accordance with the present invention, Figure 2 is a reduced plan view thereof, Figure 3 is a vertical sectional view on the line 3—3 of Figure 2, Figure 4 is a reduced vertical sectional view of a modified form of joint clamping device, Figure 5 is a vertical sectional view on the line 5—5 of Figure 4, Figure 6 is a plan view of a modified arrangement for dealing with relative torsional and/or lateral movement, Figure 7 is a vertical sectional view on the line 7—7 of Figure 6, and Figure 8 is a vertical sectional view of a modified ararngement wherein the pressure of the springs is amplified.

In carrying the invention into effect according to one convenient form illustrated by way of example in Figures 1 to 3 as applied to a joint in which relative lateral movement between two flanges is liable to occur, one flange being rigid with the end of a pipe $a$ conveying fluid at high temperature and the other being rigid with an engine body or casing $b$, flanges $c\ d$ of rectangular form are provided abutting each other in a plane. The flanges are formed with abutting plane end faces slidably engaging each other to permit lateral or torsional sliding between them while maintaining sealing engagement.

The lower flange $d$ carries a plurality of clamping devices which in the embodiment of Figures 1 to 3 take the form of a number of bracket members $e$, each of which is secured to an edge of the engine casing flange $d$, each bracket member comprising a wall or tension frame member extending in general alignment with the conduit or pipe $a$ and having overhanging portions formed with it and supporting a plurality of spring pressed poppets or plungers $f$ the ends of which are thrust against the back face of the pipe flange $c$ by means of compression springs $g$ to slidably engage the same for forcing its abutting face against the corresponding abutting face of the lower flange $d$, while permitting sliding movement between the two. Each compression spring encircles an individual plunger and is provided with a screwed sleeve $h$ bearing against a spring cup $i$ whereby the tension of the springs may be adjusted.

The face of the pipe flange $c$ that abuts the face of the engine casing flange $d$ is furnished with a groove $j$ into which graphite lubricant may be forced under pressure in order to lubricate the abutting faces of the flanges to prevent seizure and to allow free sliding movement even under high temperature conditions.

With this arrangement, relative lateral movement may take place between the pipe flange and the engine casing flange in directions parallel to the abutting plane.

By causing the springs to act upon plungers which in turn apply pressure to the pipe flange, the springs are to some extent protected from temperature effects.

In carrying the invention into effect according to a modified arrangement illustrated in Figures 4 and 5, the compression springs in the above example are substituted by tension springs $k$ anchored at their lower ends to the brackets and anchored at their upper ends to a yoke member $m$ carrying adjusting screws $n$ bearing upon the upper end of the plungers $f$.

In applying the invention according to one example to a pipe joint in which the pipe end $a$ is liable to relative torsional and lateral movement in relation to a fixed part $b$ as shown in Figures 6 and 7, annular flanges $c\ d$ and sectorial brackets $o$ are provided, each bracket sector carrying a plurality of springs and plungers as before. The bracket sectors may be provided with abutment surfaces $p$ to prevent lateral movement between the flanges whilst permitting torsional movement to take place.

In a further modified arrangement illustrated in Figure 8 the force exerted by a series of springs $q$ is amplified by the provision of see-saw levers $r$ the fulcra of which comprise spherical washers $s$ on bolts $t$ which form the tension members carried by the lower flange $d$ for clamping the flanges together. Guide rollers $u$ are provided on the bolts and two semi-circular load rings $v$ are interposed between the ends of the levers $r$ and the flange $c$.

What is claimed is:

1. A pipe joint comprising a pair of flanges having plane end faces abutting each other in slidable sealing relation, and a plurality of clamping devices carried by one of said flanges and surrounding and overhanging the other said flange, each clamping device comprising a tension frame member and a plurality of spring pressed members carried thereby and positioned for applying pressure to the back of the second said flange for forcing it against the first said flange, at least one of the said flanges having a lubricating groove in its face which engages the other flange and a channel in one of said flanges for supplying lubricant to the groove and lubricating the abutting faces of the flanges.

2. A pipe joint according to claim 1, in which the clamping devices comprise bracket members fastened to the first said flange, and the spring pressed members comprise poppet rods slidably carried in the brackets.

3. A pipe joint according to claim 1, in which the clamping devices comprise levers fulcrumed on the tension members, and extending outwardly beyond the second said flange, springs acting on the outwardly extending ends of the said levers for forcing them away from the first said flange and the levers also having inwardly extending ends overhanging the back face of the second said flange for applying pressure thereto force the abutting faces of the flanges together.

4. A pipe joint according to claim 1, comprising also abutments preventing bodily sliding of one flange on the other but permitting torsional sliding movement therebetween.

5. A pipe joint according to claim 3, in which the levers are arranged so that the distance between their fulcra and the springs is greater than the distance between their fulcra and inner ends, whereby the force exerted by the springs is amplified.

THOMAS WALTER FALCONER BROWN.

REFERENCES CITED

The following references are of record in the file of this patent:

UNITED STATES PATENTS

| Number | Name | Date |
| --- | --- | --- |
| 924,039 | Clark | June 8, 1909 |
| 1,803,665 | Dennis | May 5, 1931 |
| 2,246,600 | Putnam et al. | June 24, 1941 |